(12) United States Patent
Kim

(10) Patent No.: US 11,874,467 B2
(45) Date of Patent: Jan. 16, 2024

(54) FTIR-BASED DIFFRACTIVE OPTICAL STRUCTURE, AND WAVEGUIDE DEVICE AND AUGMENTED REALITY DISPLAY EACH INCLUDING SAME

(71) Applicant: KOREA UNIVERSITY RESEARCH AND BUSINESS FOUNDATION, SEJONG CAMPUS, Sejong-si (KR)

(72) Inventor: Hwi Kim, Sejong-si (KR)

(73) Assignee: Korea University Research And Business Foundation, Sejong Campus, Sejong-Si (KR)

( * ) Notice: Subject to any disclaimer, the term of this patent is extended or adjusted under 35 U.S.C. 154(b) by 323 days.

(21) Appl. No.: 17/434,621

(22) PCT Filed: Feb. 26, 2020

(86) PCT No.: PCT/KR2020/002766
§ 371 (c)(1),
(2) Date: Aug. 27, 2021

(87) PCT Pub. No.: WO2020/175920
PCT Pub. Date: Sep. 3, 2020

(65) Prior Publication Data
US 2022/0146825 A1    May 12, 2022

(30) Foreign Application Priority Data
Feb. 28, 2019  (KR) .......................... 10-2019-0023545

(51) Int. Cl.
*G02B 27/01* (2006.01)
*F21V 8/00* (2006.01)
*G02B 27/42* (2006.01)

(52) U.S. Cl.
CPC ....... *G02B 27/0172* (2013.01); *G02B 6/0038* (2013.01); *G02B 27/4272* (2013.01); *G02B 27/0101* (2013.01)

(58) Field of Classification Search
None
See application file for complete search history.

(56) References Cited

U.S. PATENT DOCUMENTS

| | | | |
|---|---|---|---|
| 5,504,772 A | 4/1996 | Deacon | |
| 8,548,290 B2 * | 10/2013 | Travers | G02B 27/01 359/569 |

(Continued)

FOREIGN PATENT DOCUMENTS

| | | |
|---|---|---|
| KR | 10-1997-0705855 | 10/1997 |
| KR | 10-2016-0101104 | 8/2016 |

(Continued)

OTHER PUBLICATIONS

International Search Report in International Application No. PCT/KR2020/002766, dated Jun. 9, 2020 (6 pages).

*Primary Examiner* — Jerry Rahll
(74) *Attorney, Agent, or Firm* — Nixon Peabody LLP

(57) ABSTRACT

Various embodiments relate to an FTIR-based diffractive optical structure, and a waveguide device and an augmented reality display each including same. The augmented reality display may comprise: a projector configured to provide light related to an image; and a waveguide device for outputting at least a part of the light, wherein: the waveguide device comprises a waveguide and a diffractive optical structure disposed on one surface of the waveguide; and the diffractive optical structure comprises an expansion grating disposed at the one surface of the waveguide and an output grating disposed along the axis perpendicular to the one (Continued)

surface of the waveguide and overlapping at least a partial area of the expansion grating.

17 Claims, 13 Drawing Sheets

(56) References Cited

U.S. PATENT DOCUMENTS

| | | | | |
|---|---|---|---|---|
| 9,791,703 | B1* | 10/2017 | Vallius | G02B 6/005 |
| 10,042,096 | B2* | 8/2018 | Simmonds | G02B 6/34 |
| 10,114,220 | B2* | 10/2018 | Grey | G02B 27/0081 |
| 10,359,635 | B2* | 7/2019 | Grey | G02B 6/0016 |
| 10,795,156 | B2* | 10/2020 | Marshall | G02B 6/00 |
| 10,871,649 | B2* | 12/2020 | Simmonds | G02B 6/005 |
| 11,067,811 | B2* | 7/2021 | Chi | G02B 27/0081 |
| 11,169,379 | B2* | 11/2021 | Chi | G02B 6/0026 |
| 11,480,722 | B2* | 10/2022 | Jiang | G02B 6/0038 |
| 11,543,594 | B2* | 1/2023 | Grant | G02B 27/0081 |
| 2013/0314793 | A1* | 11/2013 | Robbins | G02B 27/0172 359/630 |
| 2019/0004321 | A1* | 1/2019 | Grey | G02B 27/4272 |
| 2020/0225479 | A1* | 7/2020 | Chi | G02F 1/011 |
| 2021/0109273 | A1* | 4/2021 | Jiang | G02B 6/0038 |
| 2022/0146825 | A1* | 5/2022 | Kim | G02B 6/0038 |
| 2023/0161217 | A1* | 5/2023 | Feng | G02F 1/292 385/10 |

FOREIGN PATENT DOCUMENTS

| | | |
|---|---|---|
| KR | 10-2017-0039655 | 4/2017 |
| KR | 10-2018-0130580 | 12/2018 |
| KR | 10-2019-0015507 | 2/2019 |
| WO | WO 2017/120320 A1 | 7/2017 |

* cited by examiner (a)  (b)

FTIR-BASED DIFFRACTIVE OPTICAL STRUCTURE, AND WAVEGUIDE DEVICE AND AUGMENTED REALITY DISPLAY EACH INCLUDING SAME

REFERENCES TO RELATED APPLICATIONS

This application is a U.S. national stage of PCT/KR2020/002766 filed on Feb. 26, 2020, which claims the benefits of Korean patent application No. 10-2019-0023545, filed on Feb. 28, 2019, the contents of which are all incorporated herein by reference in their entireties.

TECHNICAL FIELD

Various embodiments relate to an FTIR-base diffractive optical structure, and a waveguide device and an augmented reality display including the same.

BACKGROUND ART

In general, an augmented reality display overlaps a virtual image on the real world seen by a user's eye. The augmented reality display makes ambiguous the distinction of a user between the real world and the virtual image. For example, the augmented reality display may be implemented as a head mounted display (HMD) which may be worn by a user. Such an augmented reality display may include a waveguide and a plurality of diffraction gratings. The diffraction gratings may be mounted on the waveguide and diffract received light. Accordingly, when the diffraction gratings output at least some of the received light, a user can monitor an image related to the received light.

DISCLOSURE

Technical Problem

However, in the augmented reality display, the diffraction gratings are separated and disposed on one face of the waveguide. Accordingly, in the waveguide, a space for an output grating that substantially outputs at least some of received light among the diffraction gratings is narrow. Accordingly, a monitoring area (e.g., an eye-box) defined so that an image can be seen by a user in accordance with the waveguide is narrow. Accordingly, there is a need for a scheme capable of expanding the monitoring area even without enlarging the waveguide.

Technical Solution

A diffractive optical structure disposed on one face of a waveguide in an augmented reality display according to various embodiments may include an extension grating disposed on one face of a waveguide and an output grating disposed to overlap at least some area of the extension grating along an axis perpendicular to the one face.

A waveguide device of an augmented reality display according to various embodiments includes a waveguide and a diffractive optical structure disposed on one face of the waveguide. The diffractive optical structure may include an extension grating disposed on the one face and an output grating disposed to overlap at least some area of the extension grating along an axis perpendicular to the one face.

An augmented reality display according to various embodiments includes a projector configured to provide light related to an image and a waveguide device outputting at least some of the light. The waveguide device includes a waveguide and a diffractive optical structure disposed on one face of the waveguide. The diffractive optical structure may include an extension grating disposed on the one face, and an output grating disposed to overlap at least some area of the extension grating along an axis perpendicular to the one face. Furthermore, a degree of freedom for the location of a user's eye can be increased in accordance with the waveguide.

Advantageous Effects

According to various embodiments, in the augmented reality display, the size of the output grating can be enlarged because the extension grating and the output grating are disposed to overlap each other on one face of the waveguide. Accordingly, since an area where light is outputted by the output grating is expanded, a monitoring area where an image may be monitored by a user can be expanded in accordance with the waveguide. Accordingly, although the waveguide is not enlarged, the monitoring area can be expanded. Due to this, in implementing the augmented reality display, a form factor can be improved and the monitoring area can also be expanded.

MODE FOR INVENTION

Figure 1:
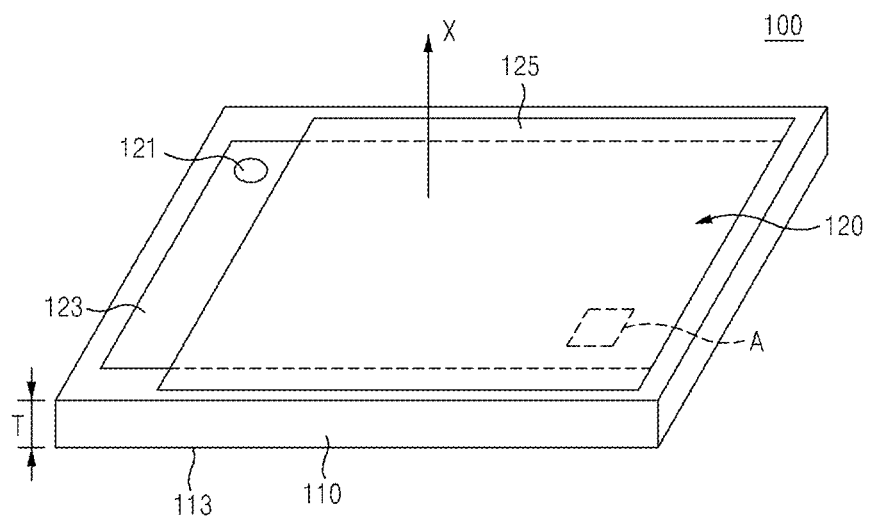
FIG. 1 is a diagram illustrating a waveguide device according to various embodiments.

Hereinafter, various embodiments of this document are described with reference to the accompanying drawings.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

An augmented reality (AR) display according to various embodiments may include a projector and a waveguide device. The projector may provide light related to an image. The waveguide device may output at least some of the light. In this case, the waveguide device may output a plurality of pieces of light based on the light received from the projector. Accordingly, a user of the AR display can monitor an image from the plurality of pieces of light. In the waveguide device, a monitoring area (e.g., an eye-box) where an image may be monitored by a user may be defined.

Figure 2:
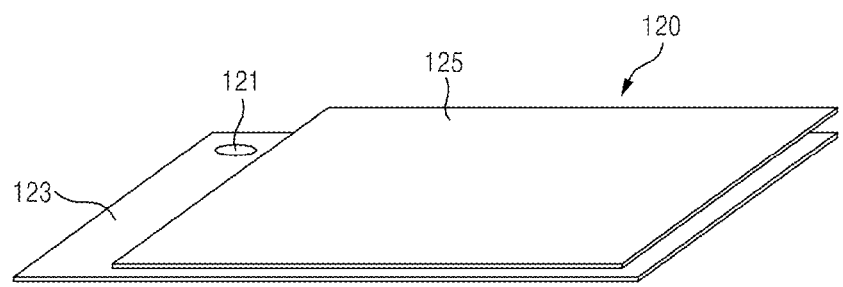
FIG. 2 is a diagram illustrating a diffractive optical structure according to various embodiments.
Figure 3:
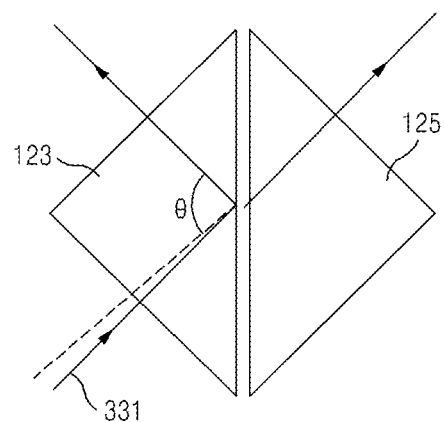
FIG. 3 is a diagram for describing characteristics of the diffractive optical structure according to various embodiments.

FIG. 1 is a diagram illustrating a waveguide device 100 according to various embodiments. FIG. 2 is a diagram illustrating a diffractive optical structure according to various embodiments. FIG. 3 is a diagram for describing characteristics of the diffractive optical structure according to various embodiments.

Referring to FIG. 1, the waveguide device 100 may include a waveguide 110 and a diffractive optical structure 120.

The waveguide 110 may transmit light. The waveguide 110 may include a first face 111 and a second face 113. Furthermore, the first face 111 and the second face 113 may be isolated from each other by a thickness T of the waveguide 110. In this case, an axis X extending in a direction perpendicular to the first face 111 may be defined.

The diffractive optical structure 120 may output at least some of light. At this time, the diffractive optical structure 120 may duplicate the light while diffracting the light. Accordingly, the light inputted to the diffractive optical structure 120 may be duplicated as a plurality of pieces of light. The diffractive optical structure 120 may be disposed on one face of the waveguide 110, that is, on the first face 111. As illustrated in FIG. 2, the diffractive optical structure 120 may include an input grating 121, an extension grating 123 and an output grating 125.

The input grating 121 may input light to the extension grating 123. To this end, the input grating 121 may diffract the light inputted to the input grating 121. At this time, the input grating 121 may diffract the light inputted to the input grating 121 in opposite to the extension grating 123. The input grating 121 may be disposed on the first face 111 of the waveguide 110.

The extension grating 123 may be disposed on the first face 111 of the waveguide 110. In this case, the extension grating 123 may be disposed on at least some of the first face 111. According to an embodiment, the extension grating 123 may surround at least some of the input grating 121. The extension grating 123 may expand light inputted from the input grating 121 to the extension grating 123. The extension grating 123 may duplicate the light inputted to the extension grating 123 while diffracting the light. At this time, the extension grating 123 may diffract the light inputted to the extension grating 123 in opposite to the output grating 125. Furthermore, the extension grating 123 may duplicate the light inputted to the extension grating 123 as a plurality of pieces of light in accordance with an area of the extension grating 123. Accordingly, while the extension grating 123 diffracting and duplicating the light inputted to the extension grating 123, the plurality of pieces of light may be inputted from the extension grating 123 to the output grating 125.

The output grating 125 may be disposed to overlap at least some area of the extension grating 121. In this case, the output grating 125 may overlap at least some area of the extension grating 123 along the axis X. In this case, the output grating 125 may be disposed to overlap some area of the extension grating 123 along the axis X. The input grating 125 may be disposed in the remaining area of the extension grating 123, that is, in an area not overlapping the output grating 125 along the axis X. The output grating 125 may output light inputted from the extension grating 123 to the output grating 125. At this time, the output grating 125 may output the light in a direction parallel to the direction of the light inputted to the output grating 125.

According to an embodiment, the extension grating 123 and the output grating 125 may be isolated from each other and disposed along the axis X. In this case, frustrated total internal reflection (FTIR) may occur between the extension grating 123 and the output grating 125, as illustrated in FIG. 3. Accordingly, at least some of light 331 may be transmitted from the extension grating 123 to the output grating 125. In this case, based on an interval between the extension grating 123 and the output grating 125, some of the light 331 inputted to the extension grating 123 may be transmitted to the output grating 125, and the remainder thereof may be diffracted or reflected and may travel in the extension grating 123. Accordingly, while the extension grating 123 diffracts and duplicates the light inputted to the extension grating 123, a plurality of pieces of light may be inputted from the extension grating 123 to the output grating 125.

Figure 4:
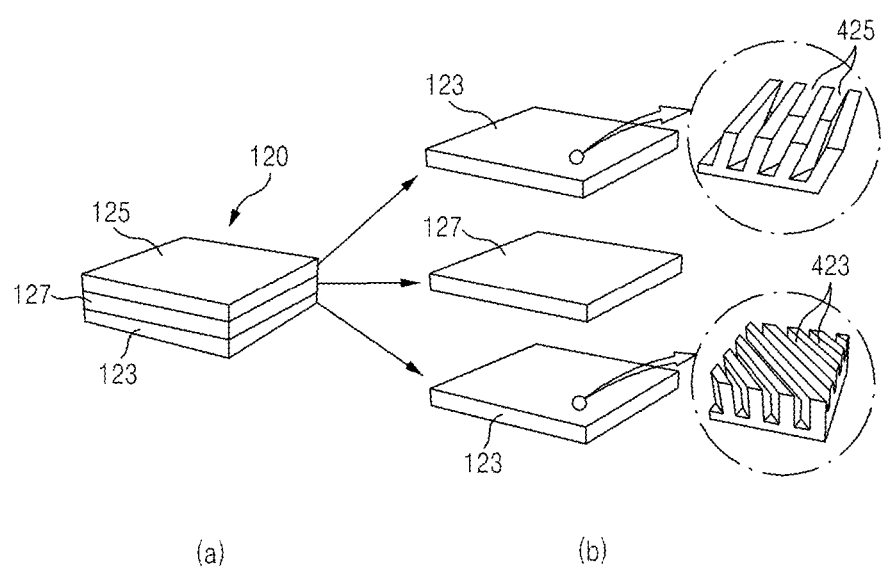
FIG. 4 is a diagram illustrating the diffractive optical structure according to an embodiment.

FIG. 4 is a diagram illustrating the diffractive optical structure 120 according to an embodiment. FIGS. 5A, 5B, 6, 7 and 8 are diagrams for describing characteristics of the diffractive optical structure 120 according to an embodiment.

Referring to FIG. 4, the diffractive optical structure 120 according to an embodiment includes the input grating 121, the extension grating 123 and the output grating 125. An air gap 127 may be formed between the extension grating 123 and the output grating 125. As illustrated in (a) of FIG. 4, as the extension grating 123 and the output grating 125 are perpendicularly arranged along the axis X, the air gap 127 may be formed between the extension grating 123 and the output grating 125.

The extension grating 123 may have a structure in which a plurality of first grooves 423 is formed as illustrated in (b) of FIG. 4. Such a structure of the extension grating 123 may be formed to duplicate light received from the input grating 121. In this case, the structure of the extension grating 123 may be represented as in Equation 1 below. As illustrated in (b) of FIG. 4, the output grating 125 may have a structure in which a plurality of second grooves 425 is formed. Such a structure of the output grating 125 may be formed to output light, received from the extension grating 123, in a direction parallel to the direction of the received light. In this case, the structure of the output grating 125 may be represented as in Equation 2 below.

$$\varepsilon_{ex}(x,y)=a_0+a_1\exp(j(G_{ex,x}x+G_{ex,y}y)) \qquad \text{[Equation 1]}$$

$$\varepsilon_{op}(x,y)=b_0+b_1\exp(j(G_{op,x}x)) \qquad \text{[Equation 2]}$$

Figure 5A:
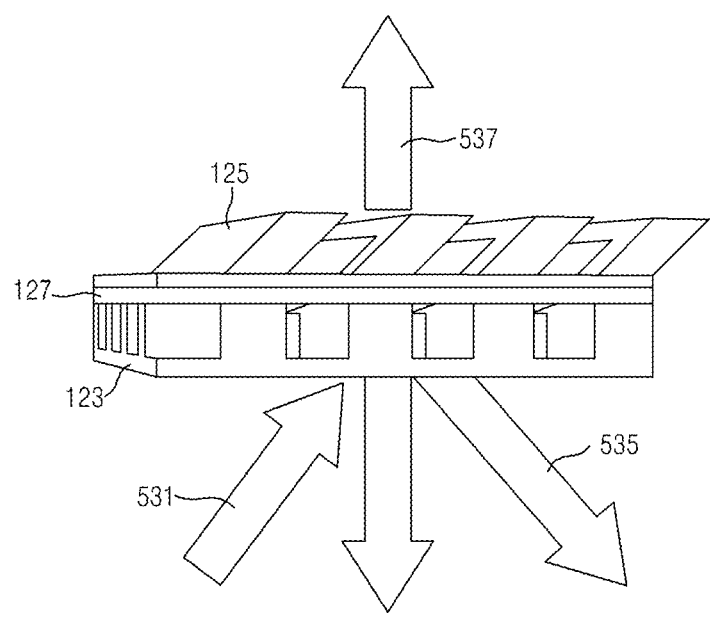
FIGS. 5A, 5B, 6, 7 and 8 are diagrams for describing characteristics of the diffractive optical structure according to an embodiment.
Figure 5B:
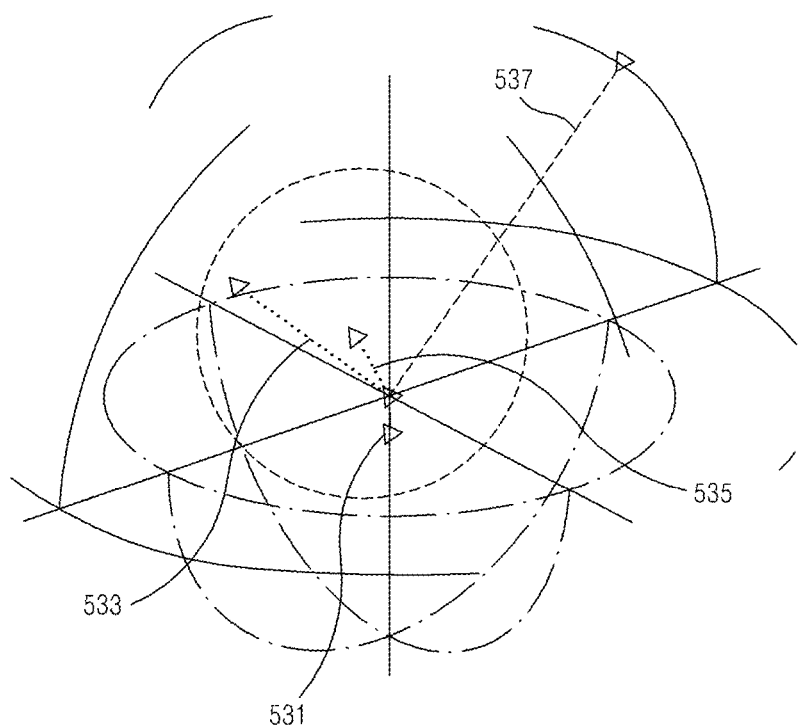

According to an embodiment, as at least some of light 531 inputted to the extension grating 123 are transmitted to the output grating 125, at least some of the light inputted to the output grating 125 may be outputted. For example, each of the extension grating 123 and the output grating 125 may have a refractive index of 1.5. The air gap 127 having a nano scale may be formed between the extension grating 123 and the output grating 125. In this case, as illustrated in FIG. 5A, the light 531 inputted to the extension grating 123 may be classified as any one of first light 533, second light 535 or third light 537. As illustrated in FIG. 5B, the pieces of light may be represented in a vector space. In this case, the light 531 inputted to the extension grating 123 may be inputted at a greater incident angle than a predetermined critical angle. In this case, the first light 533 may indicate light diffracted in the extension grating 123. The second light 535 may indicate light reflected by the extension grating 123. The third light 537 may indicate light transmitted from the extension grating 123 to the output grating 125.

Figure 6:
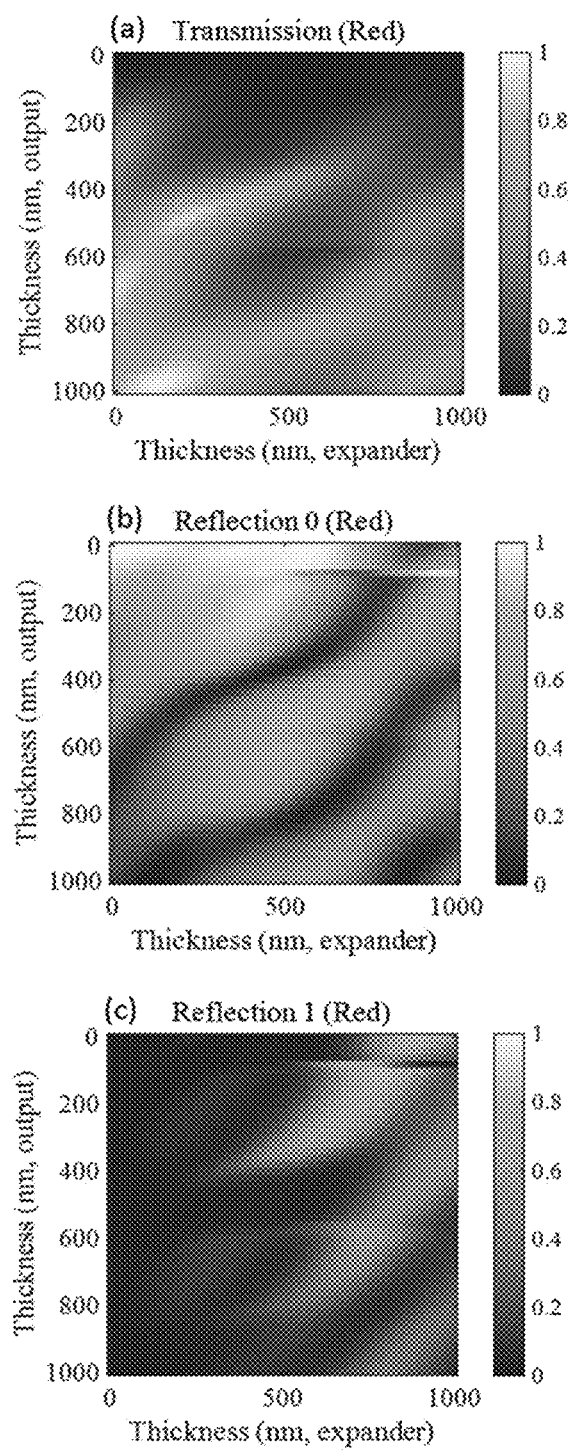
Figure 7:
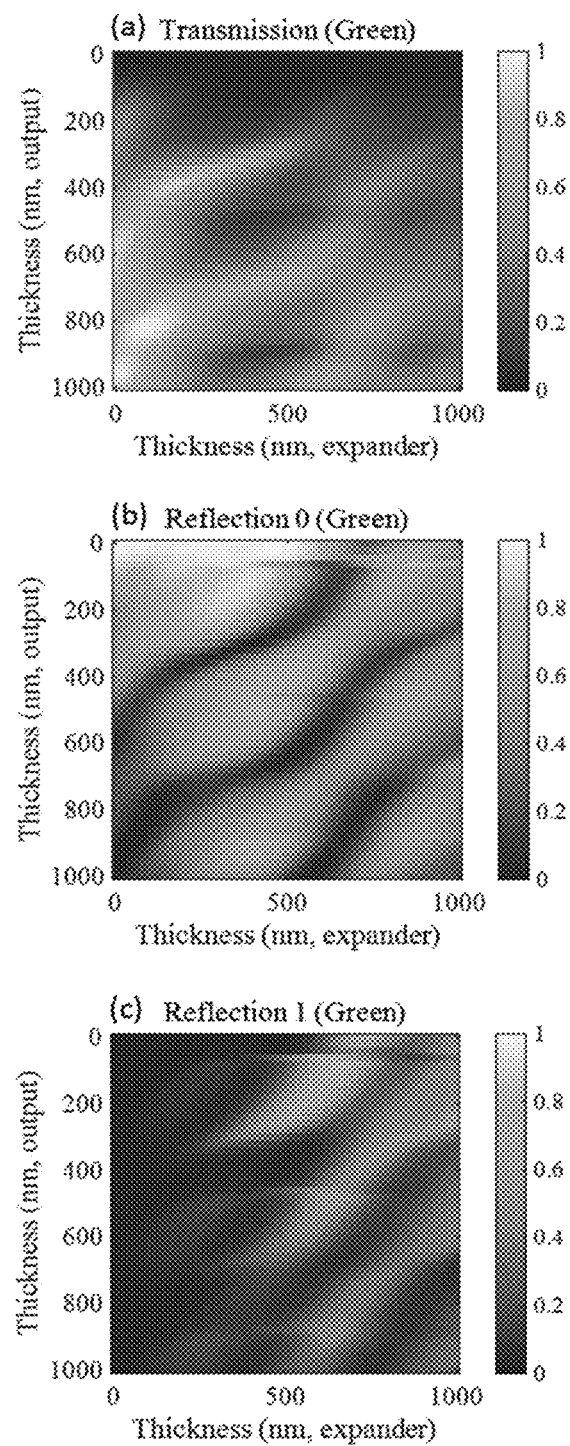
Figure 8:
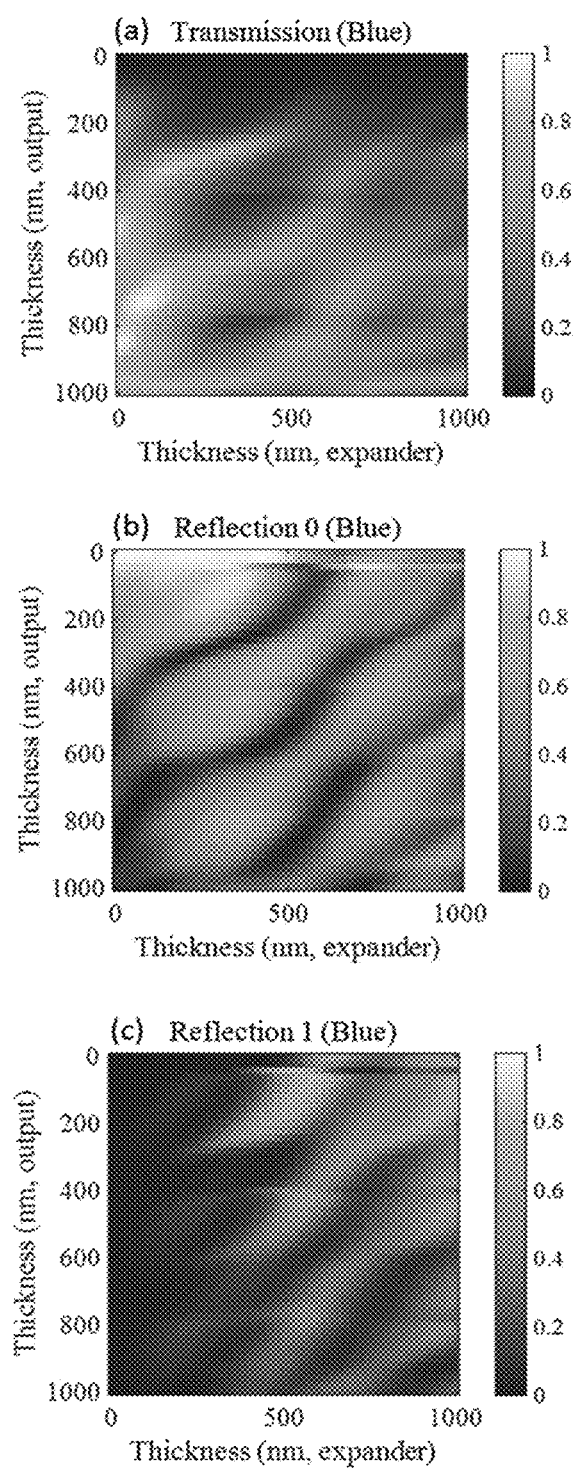

According to an embodiment, the first light 533, the second light 535 or the third light 537 may have a different intensity depending on a thickness of the extension grating 123 and a thickness of the output grating 125 as illustrated in FIGS. 6, 7 and 8. FIG. 6 may indicate the results of reactions of the extension grating 123 and the output grating 125 with light having a red wavelength. FIG. 7 may indicate the results of reactions of the extension grating 123 and the output grating 125 with a green wavelength. FIG. 8 may indicate the results of reactions of the extension grating 123 and the output grating 125 with a blue wavelength. In FIGS. 6, 7 and 8, a transverse axis may correspond to the thickness of the extension grating 123, and a longitudinal axis may correspond to the thickness of the output grating 125. Furthermore, in FIGS. 6, 7 and 8, (a) may indicate the intensity of the third light 537, (b) may indicate the intensity of the second light 535, and (c) may indicate the intensity of the first light 533.

Figure 9:
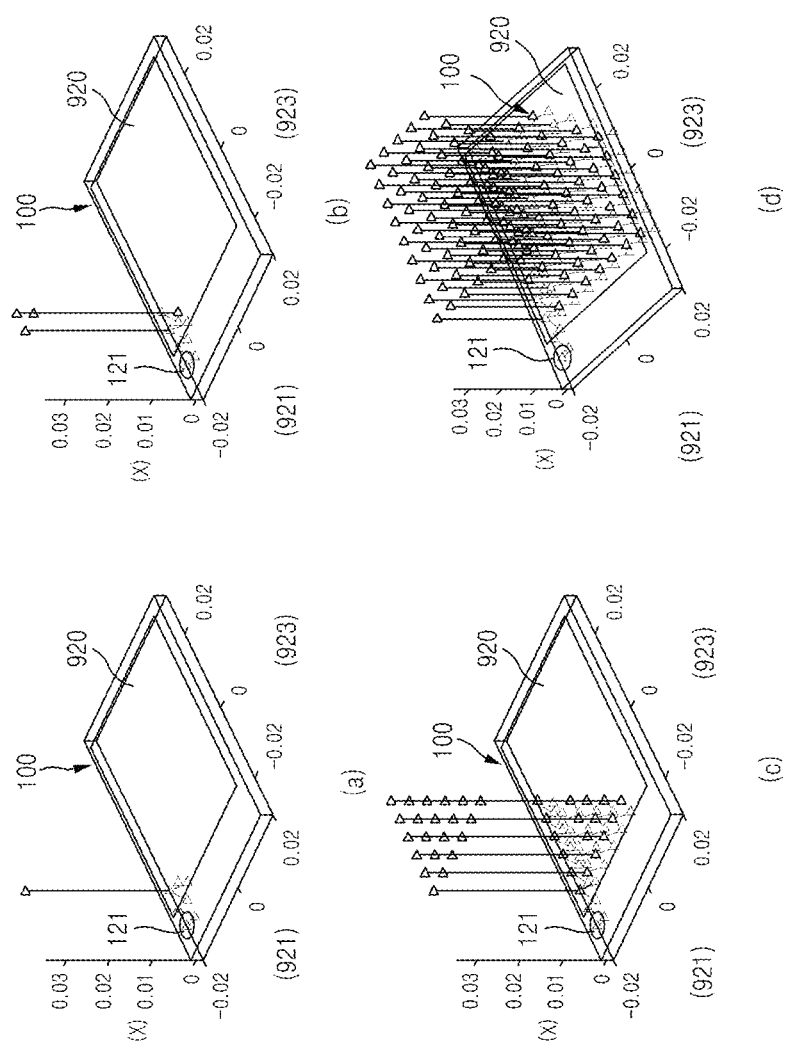
FIGS. 9 and 10 are diagrams for describing characteristics of the waveguide device according to various embodiments.
Figure 10:
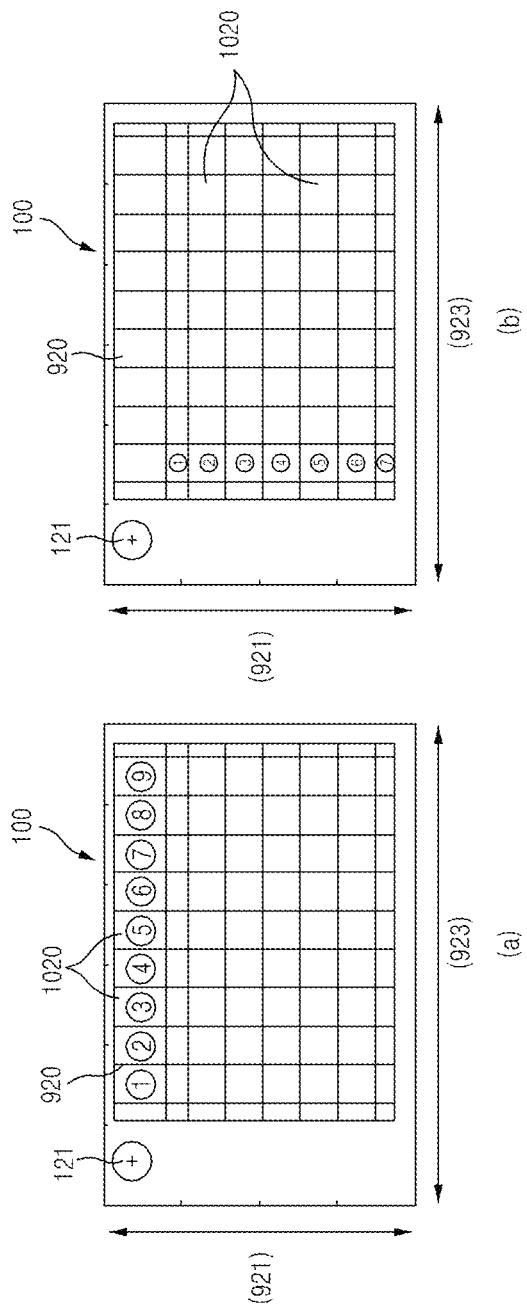

FIGS. 9 and 10 are diagrams for describing characteristics of the waveguide device 100 according to various embodiments.

Referring to FIG. 9, a plane 920 may be defined in the waveguide device 100. The plane 920 may be parallel to the first face 111 of the waveguide 110, and may be defined between the extension grating 123 and the output grating 125. The plane 920 may be formed by a first axis 921 and a second axis 923 perpendicular to each other. In this case, the first axis 921 and the second axis 923 may be perpendicularly defined in the axis X extending in a direction perpendicular to the first face 111.

According to various embodiments, the duplication and output of light received from the input grating 121 may be simultaneously performed in the plane 920. As the light received from the input grating 121 is duplicated along the plane 920, some of the light received from the input grating 121 may be outputted from the plane 920. At this time, as the light received from the input grating 121 is duplicated along the first axis 921 and the second axis 923, some of the light received from the input grating 121 may be outputted from the plane 920. In this case, while the light received from the input grating 121 is duplicated along the plane 920 in order of FIGS. 6(a), 6(b) and 6(c), some of the duplicated light may be outputted from the plane 920.

According to an embodiment, as illustrated in (a) and (b) FIG. 7, the plane 920 may include a plurality of output areas 1020 arranged along the first axis 921 and the second axis 923. Light received from the input grating 121 may be duplicated as a plurality of pieces of light in the output areas 1020, so that the plurality of pieces of light may be outputted. The output areas 1020 may be formed to have higher output rates as the output areas become distant from the input grating 121. For example, as illustrated in (a) of FIG. 7, the output areas 1020 may be formed to have higher output efficiency as the output areas become distant from the input grating 121 as in Table 1 below in accordance with identifiers determined along the second axis 923. Meanwhile, as illustrated in (b) of FIG. 7, the output areas 1020 may be formed to have higher output efficiency as the output areas become distant from the input grating 121 as in Table 2 below in accordance with identifiers determined along the first axis 921. This may be obtained by differently forming at least any one of the thicknesses of the output areas 1020, for example, the thickness of the extension grating 123 or the thickness of the output grating 125. Accordingly, intensities of pieces of light outputted from the output areas 1020 in the plane 920 may be uniform.

TABLE 1

| Identifier | Thickness (nm) | | Reflection efficiency | Diffraction efficiency | Output efficiency |
| --- | --- | --- | --- | --- | --- |
| | Extension grating | Output grating | | | |
| ① | 520 | 100 | 0.8889 | 0.0972 | 0.0139 |
| ② | 680 | 0 | 0.8750 | 0.1094 | 0.0156 |
| ③ | 680 | 40 | 0.8571 | 0.1250 | 0.0179 |
| ④ | 520 | 200 | 0.8333 | 0.1458 | 0.0208 |
| ⑤ | 580 | 120 | 0.8000 | 0.1750 | 0.0250 |
| ⑥ | 560 | 180 | 0.7500 | 0.2188 | 0.0312 |
| ⑦ | 1000 | 180 | 0.6667 | 0.2817 | 0.0417 |
| ⑧ | 620 | 180 | 0.5000 | 0.4375 | 0.0625 |
| ⑨ | 800 | 120 | 0.0001 | 0.8750 | 0.1250 |

TABLE 2

| Identifier | Thickness (nm) | | Reflection efficiency | Output efficiency |
| --- | --- | --- | --- | --- |
| | Extension grating | Output grating | | |
| ① | 220 | 120 | 0.8571 | 0.1429 |
| ② | 200 | 140 | 0.8331 | 0.1669 |
| ③ | 160 | 180 | 0.7997 | 0.2003 |
| ④ | 140 | 180 | 0.7495 | 0.2505 |
| ⑤ | 0 | 18 | 0.6659 | 0.3341 |
| ⑥ | 0 | 500 | 0.4982 | 0.5018 |
| ⑦ | 120 | 980 | 0.0072 | 0.9928 |

Figure 11:
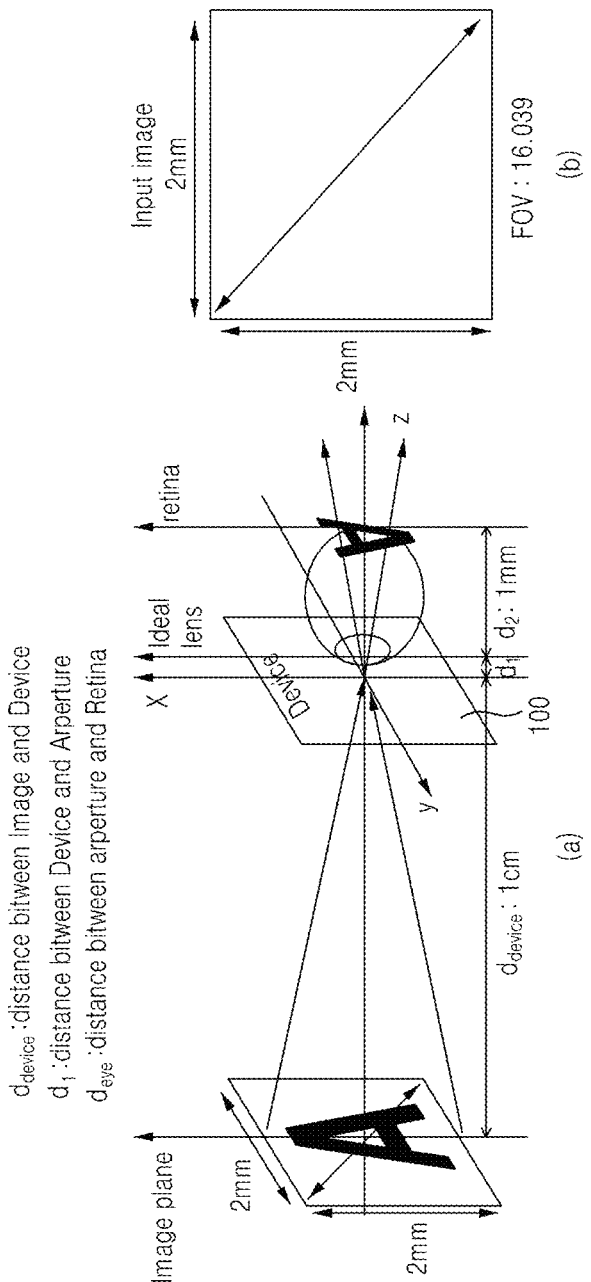
FIGS. 11 and 12 are diagrams for describing performance of the waveguide device according to various embodiments.
Figure 12:
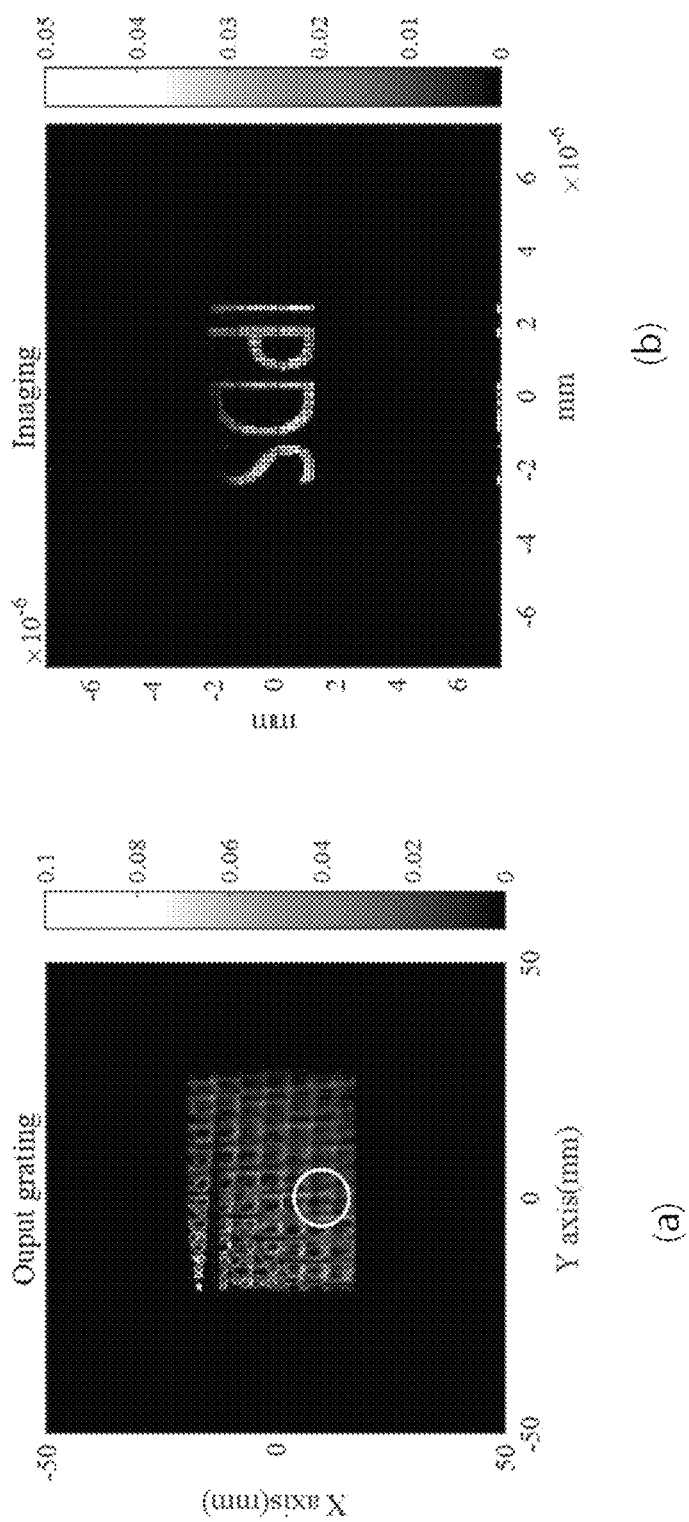

FIGS. 11 and 12 are diagrams for describing performance of the waveguide device 100 according to various embodiments.

Referring to FIG. 11, an environment for measuring performance of the waveguide device 100 according to various embodiments may be created. In this case, as illustrated in (a) of FIG. 11, a distance ($d_{device}$) between an image and the waveguide device 100, a distance ($d_1$) between the waveguide device 100 and the aperture of a user, and a distance ($d_{eye}$; $d_2$) between the aperture and retina of the user may be designed. In this case, as illustrated in (b) FIG. 11, a field of view (FOV) of the image may be set as a predetermined value, for example, 16.039. In such an environment, as the waveguide device 100 operates, performance, such as that illustrated in FIG. 12, may appear. That is, as illustrated in (a) of FIG. 12, intensities of pieces of light outputted from the output grating 125 may be uniformly distributed. Furthermore, as illustrated in (b) of FIG. 12, the visibility of an image may be high.

An AR display according to various embodiments may include a projector configured to provide light related to an image and the waveguide device 100 outputting at least some of the light provided by the projector.

The waveguide device 100 according to various embodiments may include the waveguide 110 and the diffractive optical structure 120 disposed on one face of the waveguide 110, that is, the first face 111.

The diffractive optical structure 120 according to various embodiments may include the extension grating 123 disposed on one face, that is, the first face 111, and the output grating 125 disposed to overlap at least some area of the extension grating 123 along the axis X perpendicular to one face, that is, the first face 111.

According to various embodiments, the diffractive optical structure 120 may further include the input grating 121 disposed in the remaining area of the extension grating 123.

According to various embodiments, the output grating 125 may be isolated from the extension grating 123 and disposed along the axis X.

According to various embodiments, the air gap 127 may be formed between the extension grating 123 and the output grating 125 along the axis X.

According to various embodiments, the plane 920 parallel to one face, that is, the first face 111 may be defined between the extension grating 123 and the output grating 125.

According to various embodiments, as light received from the input grating 121 is duplicated along the plane 920, some of the received light may be outputted from the plane 920.

According to various embodiments, the plane 920 may include the plurality of output areas 1020 arranged along the first axis 921 and the second axis 923 defined perpendicularly to the axis X.

According to various embodiments, the output areas 1020 may be formed to have higher output rates as the output areas become distant from the input grating 121.

According to various embodiments, the extension grating 123 may duplicate the received light along the plane 920 while diffracting the light.

According to various embodiments, the output grating 125 may transmit some of received light in a direction parallel to the direction of the received light.

According to various embodiments, in the AR display, the size of the output grating 125 can be enlarged because the extension grating 123 and the output grating 125 are disposed to overlap each other on one face of the waveguide 110. Accordingly, since an area from which light is outputted by the output grating 125 is expanded, a monitoring area in which an image may be monitored by a user can be expanded in accordance with the waveguide 110. Accordingly, although the waveguide 110 is not enlarged, the monitoring area can be expanded. Accordingly, in implementing an AR display, a form factor can be improved and the monitoring area can be expanded. Furthermore, a degree of freedom for the location of a user's eye can be increased in accordance with the waveguide 110.

Although various embodiments of this document have been described, this document may be modified in various ways without departing from the scope of various embodiments of this document. Accordingly, the scope of various embodiments of this document should not be limited to the aforementioned embodiments, but should be defined by not only the claims, but equivalents thereof.

What is claimed is:

1. A diffractive optical structure disposed on one face of a waveguide in an augmented reality display, comprising:
    an extension grating disposed on one face of a waveguide; and
    an output grating disposed to overlap at least some area of the extension grating along an axis perpendicular to the one face; and
    an input grating disposed in a remaining area of the extension grating.

2. The diffractive optical structure of claim 1, wherein the output grating is isolated from the extension grating and disposed along the axis.

3. The diffractive optical structure of claim 2, wherein an air gap is formed between the extension grating and the output grating along the axis.

4. The diffractive optical structure of claim 1, wherein:
    a plane parallel to the one face is defined between the extension grating and the output grating, and
    light received from the input grating is duplicated along the plane and some of the received light is outputted from the plane.

5. The diffractive optical structure of claim 4, wherein:
    the plane comprises a plurality of output arranged along a first axis and a second axis defined perpendicularly to the axis, and
    the output areas are formed to have higher output rates as the output areas become distant from the input grating.

6. The diffractive optical structure of claim 4, wherein:
    the extension grating duplicates the received light along the plane while diffracting the received light, and
    the output grating transmits some of the received light in a direction parallel to a direction of the received light.

7. A waveguide device of an augmented reality display; comprising:
    a waveguide; and
    a diffractive optical structure disposed on one face of the waveguide,
    wherein the diffractive optical structure comprises:
    an extension grating disposed on the one face; and
    an output grating disposed to overlap at least some area of the extension grating along an axis perpendicular to the one face,
    wherein the diffractive optical structure further comprises an input grating disposed in a remaining area of the extension grating.

8. The waveguide device of claim 7, wherein the output grating is isolated from the extension grating and disposed along the axis.

9. The waveguide device of claim 8, wherein an air gap is formed between the extension grating and the output grating along the axis.

10. The waveguide device of claim 7, wherein:
    a plane parallel to the one face is defined between the extension grating and the output grating, and
    light received from the input grating is duplicated along the plane and some of the received light is outputted from the plane.

11. The waveguide device of claim 10, wherein:
    the plane comprises a plurality of output arranged along a first axis and a second axis defined perpendicularly to the axis, and
    the output areas are formed to have higher output rates as the output areas become distant from the input grating.

12. The waveguide device of claim 10, wherein:
    the extension grating duplicates the received light along the plane while diffracting the received light, and
    the output grating transmits some of the received light in a direction parallel to a direction of the received light.

13. An augmented reality display, comprising:
    a projector configured to provide light related to an image; and
    a waveguide device outputting at least some of the light,
    wherein the waveguide device comprises a waveguide and a diffractive optical structure disposed on one face of the waveguide, and
    the diffractive optical structure comprises an extension grating disposed on the one face, and an output grating disposed to overlap at least some area of the extension grating along an axis perpendicular to the one face, wherein the diffractive optical structure further comprises an input grating disposed in a remaining area of the extension grating and receiving the light from the projector.

14. The augmented reality display of claim 13, wherein the output grating is isolated from the extension grating and disposed along the axis.

15. The augmented reality display of claim 13, wherein:
a plane parallel to the one face is defined between the extension grating and the output grating, and
the received light is duplicated along the plane and some of the received light is outputted from the plane.

16. The augmented reality display of claim 15, wherein:
the plane comprises a plurality of output arranged along a first axis and a second axis defined perpendicularly to the axis, and
the output areas are formed to have higher output rates as the output areas become distant from the input grating.

17. The augmented reality display of claim 15, wherein:
the extension grating duplicates the received light along the plane while diffracting the received light, and
the output grating transmits some of the received light in a direction parallel to a direction of the received light.

* * * * *